April 21, 1959 R. A. ANDERSON 2,883,255
AUTOMATIC PROCESS LOGGING SYSTEM
Filed Nov. 24, 1954 6 Sheets-Sheet 1

RALPH A. ANDERSON INVENTOR.

BY

Russell E Natlis ATTY.

Ralph A. Anderson INVENTOR.

BY

Russell C. Hatto ATTY.

INVENTOR.
Ralph A. Anderson

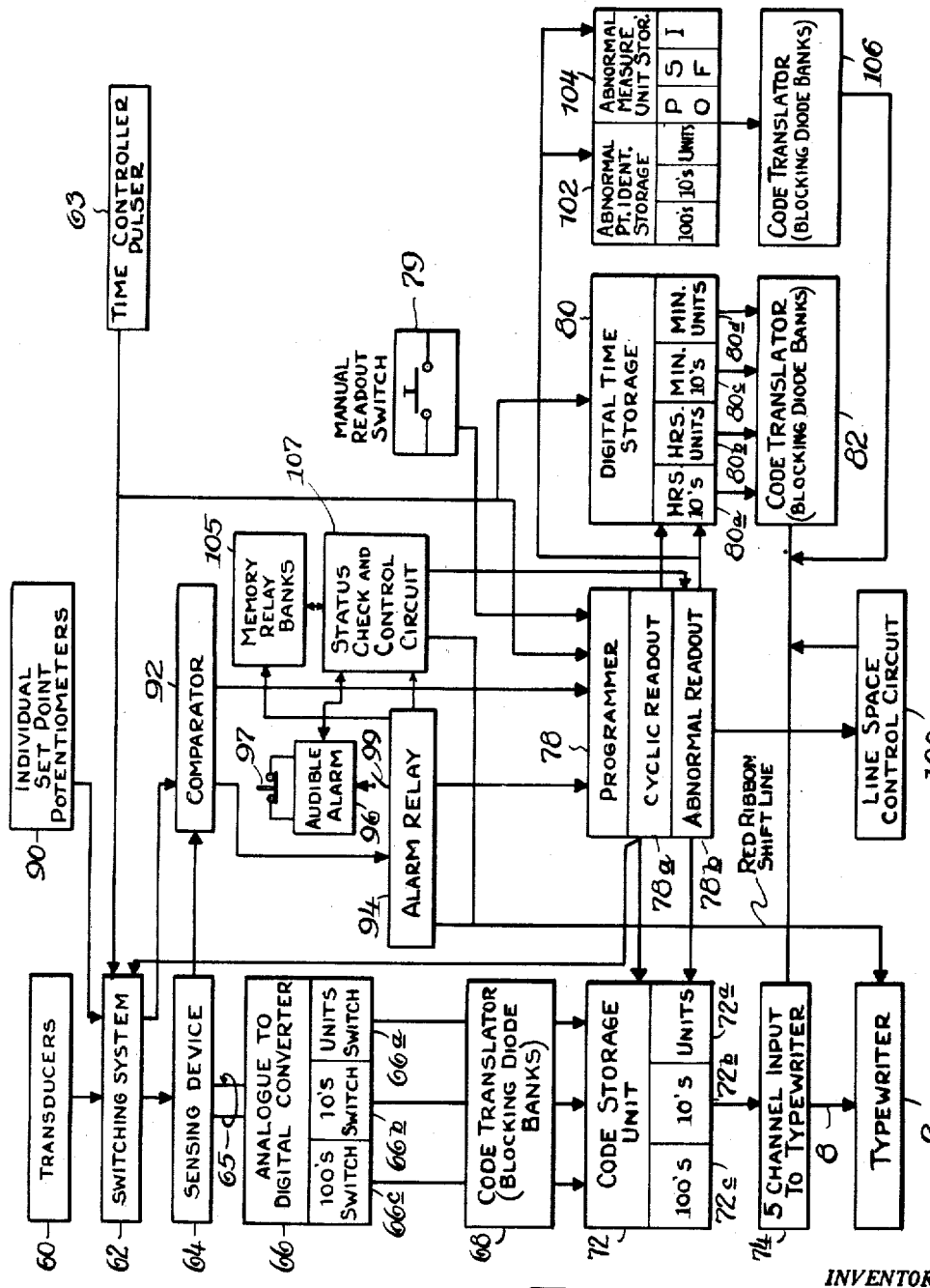

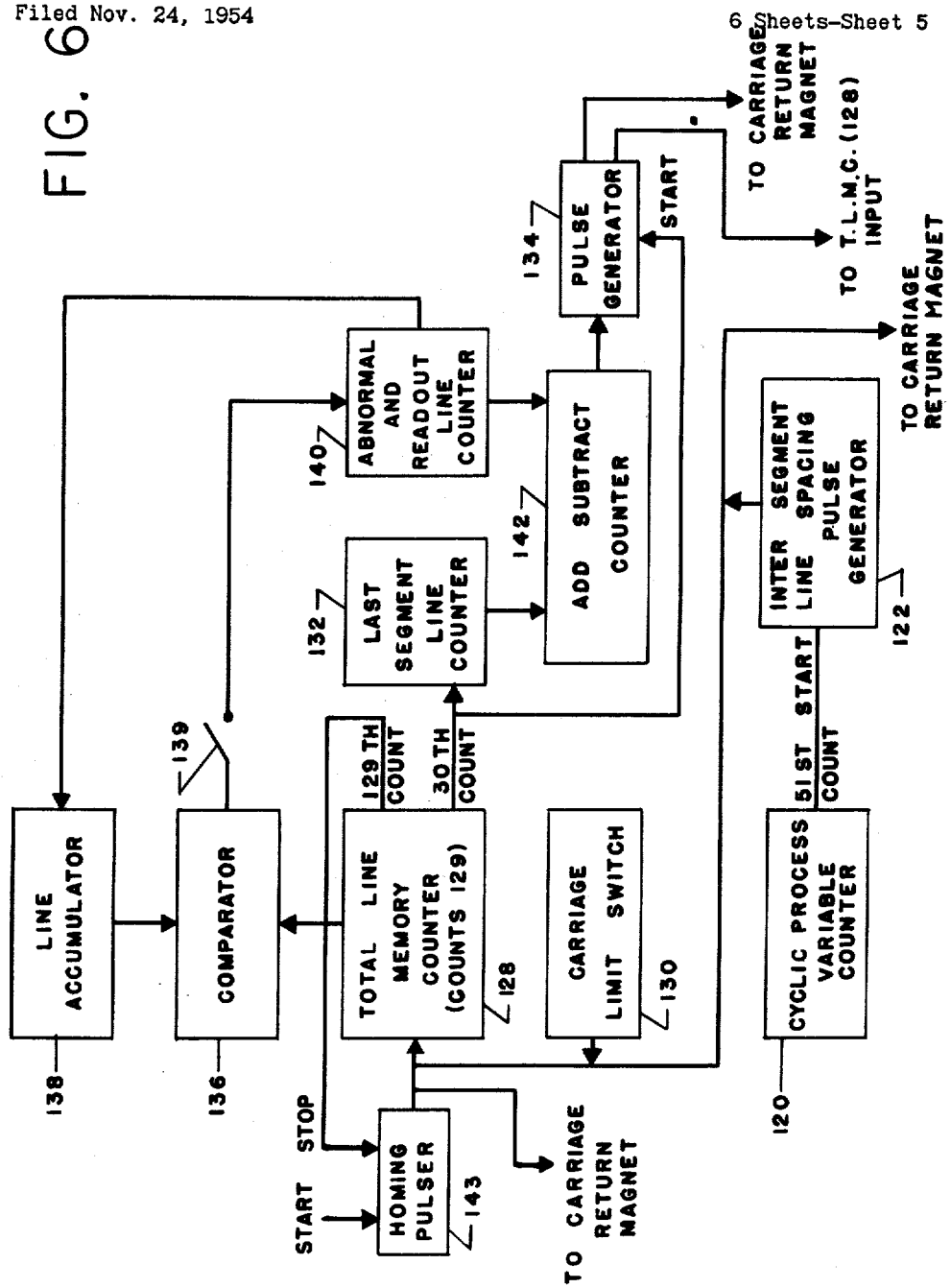

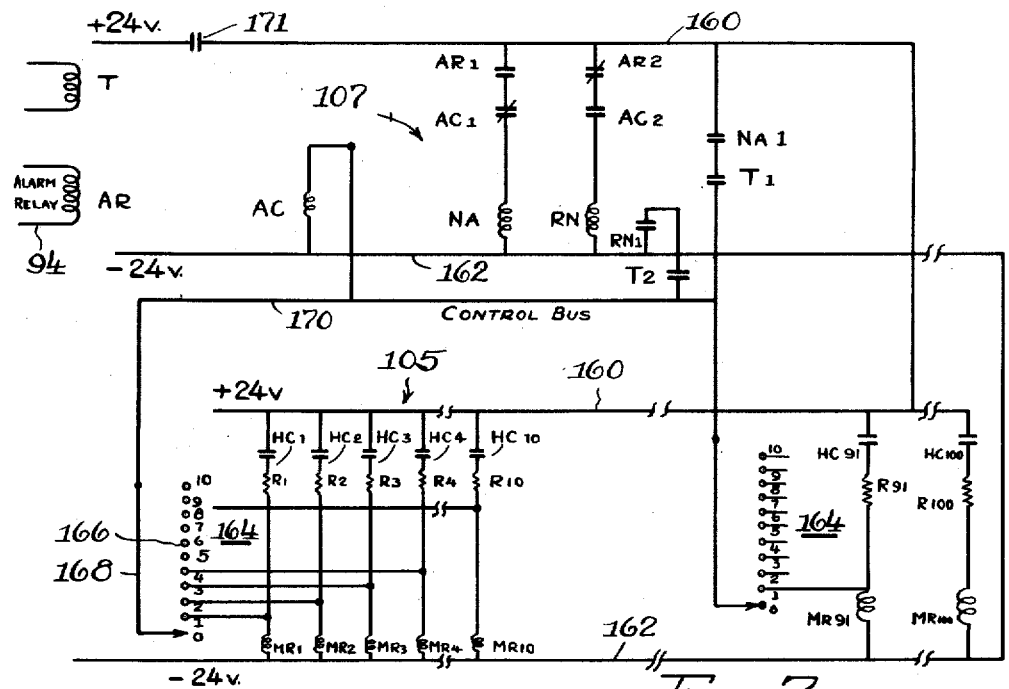
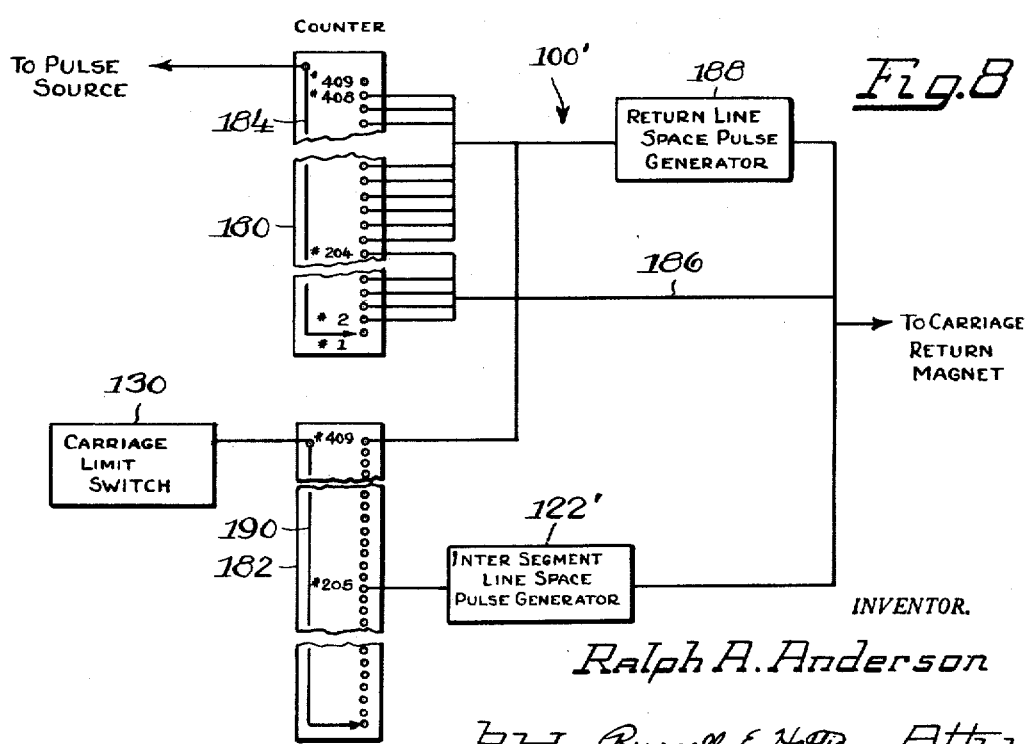

United States Patent Office 2,883,255
Patented Apr. 21, 1959

2,883,255

AUTOMATIC PROCESS LOGGING SYSTEM

Ralph A. Anderson, Deerfield, Ill., assignor to Panellit, Inc., Skokie, Ill., a corporation of Illinois Application November 24, 1954, Serial No. 470,859

17 Claims. (Cl. 346—34)

This application is a continuation in part of my co-pending application Serial No. 426,254, filed April 28, 1954, on an Automatic Process Logging System, now U.S. Patent No. 2,701,748, granted Feb. 8, 1955.

This invention relates to an improvement in the automatic process logging system disclosed in said co-pending application which discloses an automatic process logging system utilizing an automatic typewriter to record or log the various conditions of a complicated industrial process.

Information is the foundation upon which the science of automatic control is built. In order to put a process or a machine under effective control, there must be sufficient information available to completely characterize all of its operations. Once this information is converted into visible signals or messages, it can be compared with more or less predetermined criteria, and intelligent, corrective action can be applied to achieve the desired status where abnormal process variables are indicated. This invention concerns itself with a means for placing before an operator large masses of this information in printed form which can be quickly reviewed.

One of the primary objects of this invention is to provide a process logging system which periodically scans a large number of process variables and prints and arranges the process variable data in a manner where this information can be quickly and efficiently reviewed by an operator, and wherein abnormal process variables are indicated in a manner such that they may be quickly pin pointed.

Another object of the invention is to provide an automatic process logging system utilizing an automatic typewriter to record the values of the process variables and wherein abnormal process variables are indicated in a characteristic manner as, for instance, by a different colored type, so that a ready analysis of all troubles in the monitored process may be obtained quickly.

A further object of the invention is to provide an automatic process logging system which periodically scans a large number of process variables, and during the interim between periodic or cyclical recording, all points in the system are continuously scanned and off-normal points are grouped together in one place on a logging sheet or chart.

A still further object of the invention is to provide an automatic logging system with an automatic typewriter which system continuously scans a large number of process variables, and periodically sequentially records the variables on a particular portion of said logging sheet; and, further, during the interim between periodic or cyclical recordings, all abnormal data is printed in lines immediately below the last printed line in said latter section of the logging sheet.

It is a still further object of the invention to provide an automatic process logging system of the above type wherein there is provided means for sensing abnormal conditions of variables between regular recording intervals, and also for sensing variables which have just been returned to a normal condition; an ancillary object of the invention is to provide an automatic process logging system as just described wherein the abnormal and return to normal data occurring between regular recording intervals is printed once as each variable becomes abnormal and once as each abnormal variable returns to normal and, further, wherein alarm means is provided for attracting an attendant to the logging sheet during both the existence of abnormal or return to normal conditions between regular recording intervals. Still another object of the invention is to provide a distinguishing indication to all or a part of the printing for abnormal and return to normal data so that an attendant may quickly distinguish one kind of data from another. Another object of the invention is to provide automatically information on the approximate time a variable has become abnormal and has returned to normal so that an attendant may quickly determine the length of time a variable was abnormal.

A further object of the invention is to provide an automatic process logging system utilizing an automatic recording typewriter wherein the data on successively scanned process variables may be typed in vertical columns proceeding horizontally across the logging sheet even though the size of the typewriter carriage is insufficient to accommodate a logging sheet of sufficient width to receive all of the process variable data scanned during each scanning cycle.

Another object of the invention is to provide an automatic process logging system as just described wherein the variable scanned during any given scanning interval is recorded in different longitudinally spaced segments on the logging sheet, whereby a logging sheet of insufficient width to accommodate all of the variables on one line may be utilized; an ancillary object of the invention is to provide an automatic process logging system as just described wherein abnormal or/and return to normal data occurring between regular scanning intervals may be typed in said segments immediately below the last printed line therein and without the need of any memory or counting circuits for keeping track of the number of lines of abnormal or return to normal data printed between regular recording intervals.

Other objects and advantages of the invention will be apparent upon making reference to the specification to follow and the drawings disclosing several exemplary embodiments of the invention.

In the drawings:

Fig. 5 is a block diagram of the control circuits which control the operation of the automatic typewriter;

Fig. 6 is a detailed block diagram of the line spacing control means of Fig. 5;

Fig. 7 is a circuit diagram of the control circuit which controls the printing of abnormal and return to normal data between regular recording intervals;

Fig. 8 is a block diagram of a modified form of control circuit which controls the typewriter so that abnormal and return to normal data occurring between regular recording intervals may be typed within the segments of the logging sheet.

Figure 1:
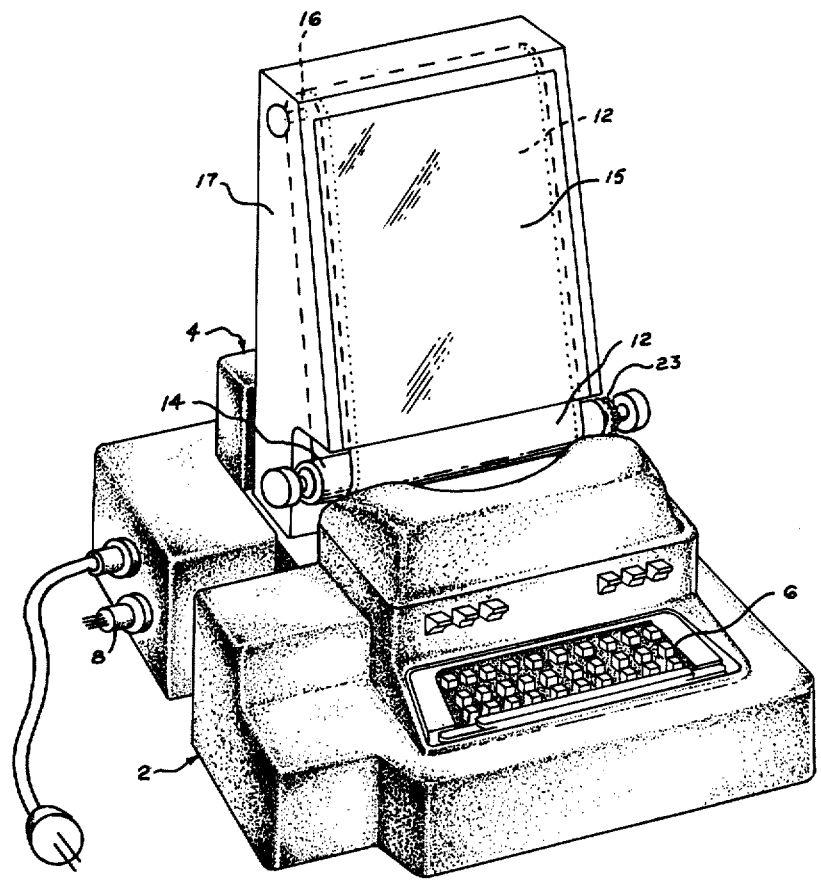
Fig. 1 is a perspective view of an automatic typewriter used with the present invention.

The automatic process logging system making up the present invention utilizes as a recording means an automatic typewriter 2 shown in Fig. 1. Except for the construction of the typewriter carriage 4, the automatic typewriter illustrated may be of any suitable well known type as, for example, the automatic typewriter sold under the name of "Flexowriter," manufactured by The Commercial Controls Corporation. As is conventional in these typewriters, a keyboard 6 is provided for manual typing to permit an operator to add notations or headings to the logging sheet or chart on which the typewriter is to print the desired data. Process variable data is fed to the typewriter in the form of electrical signals fed through a cable 8 which includes five conductors representing a five-channel code, and other control lines, such as a red ribbon shift control line which will be referred to later. Obviously, any other suitable code may be used.

The five conductors in the cable 8 may be energized in different combinations to represent the letters of the alphabet, numbers, punctuation marks, and line spacing directions. Of course, the typewriter includes suitable code-receiving and translating mechanism for actuating the keys of the typewriter automatically in response to the signals received by the typewriter.

A log sheet 12 on which the typewriter prints the received information is in the form of a continuous band or endless belt of paper which is supported in extended or endless belt of paper which is supported in extended position on the typewriter carriage by means of a bottom carriage drive roll 14 and an upper carriage idler roll 16 supported in bearings in a sheet-supporting carriage housing 17. The housing 17 includes a front transparent window 15 through which approximately one-half of a full printed record is visible, since the window exposes almost a complete side of the logging sheet roll.

The log sheet is provided at its opposite edges with a series of equally spaced perforations 18 which receive the peripheral teeth 19—20 of lower and upper sprocket wheels 21 and 22. The drive roller 14 has a driver gear 23 which is coupled to suitable gearing (not shown) which drives the roller 14 during line spacing operations. A carriage return or shift magnet (not shown) in the typewriter moves the carriage to the left margin position and spaces the logging sheet one unit by effecting the rotation of the drive gear 23. Pulsing of one of the channels of the input cable 8 effects the energization of the carriage return or shift magnet to line space the logging sheet.

Figure 3:
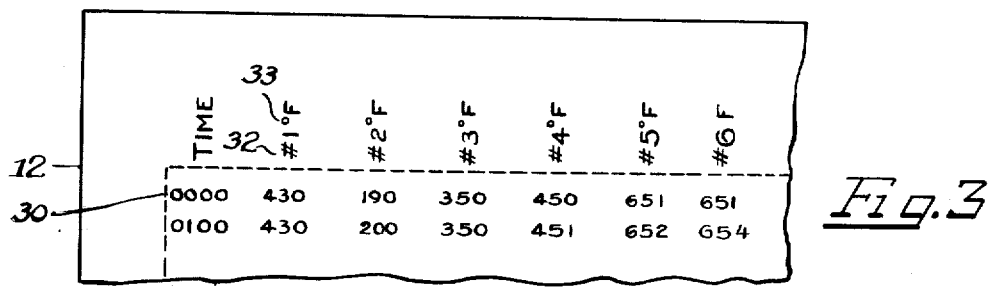
Fig. 3 is an enlarged fragmentary view of a portion of the logging sheet of Fig. 2.

The automatic typewriter 2 is controlled so as to record periodically, preferably hourly, the instantaneously scanned values of a large number of process variables in longitudinally spaced, rectangular, segmental areas 26 and 28. Each segmental area contains all the regularly recorded data for a given number of process variables which may be less than the total number scanned. In this case, the other process variables data is contained in other segmental areas, such as segment 28. Data on approximately fifty variables can be recorded in each line if standard typewriter carriages are utilized. Thus, for one hundred variables, two segments 26, 28 are needed; for two hundred, four segments are needed, etc. Printing time for one hundred variables (three digits in each variable) is approximately one minute. The time base represented in hours and minutes is typed automatically at the beginning of each line as at 30 (Fig. 3), with the hour indications progressively increasing proceeding down the respective segments. The logging sheet is preprinted with point numbers 32 and measurement units 33 at the top of each segment. Numerical data on the corresponding process variables are aligned in vertical rows in each segment under the corresponding process variable or point indication 32.

At the beginning of each hour, electrical signals representing the values of the various scanned process variables are sequentially fed to the typewriter 2 following the typing of the time indication 30 at the beginning of a line. The carriage 4 is then moved across the typewriter 2 in a conventional manner whereby measurements taken of the process variables are spaced horizontally along each line in the order in which they are scanned.

Figure 2:
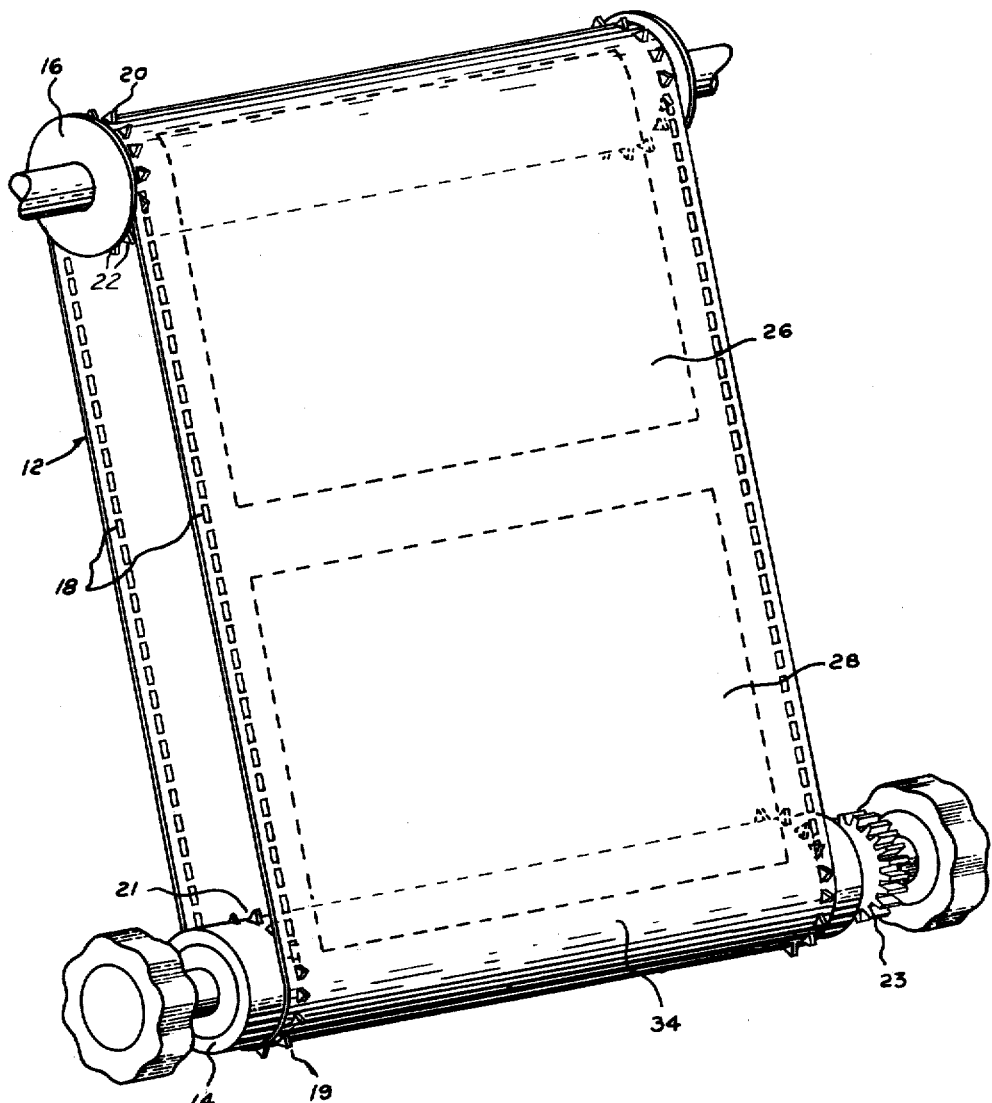
Fig. 2 is an enlarged perspective view of the logging sheet supported on the typewriter carriage of Fig. 1.

The datum at the end of any line in the first segment represents datum on the No. 50 process variable. Datum on the No. 51 process variable is then printed on the first datum line of the next segment which, in the sample log sheet illustrated in Fig. 2, is twenty-nine lines below the first line of segment No. 1. Line spacing control means are provided for automatically pulsing the carriage shift magnet in the typewriter twenty-nine times following the printing of a line in the first segment, so that the logging sheet is positioned to receive information on the No. 51 plus subsequent process variables in the corresponding line of the next segment 28. During the time that the logging sheet is being indexed, means are provided to stop the scanning of the process variable so that the No. 51 process variable will not be skipped over before the log sheet is in position to receive datum on it. Following the printing of a line on the second segment 28, the logging sheet is similarly indexed to position subsequent segments to a printing position if more than two segments are utilized, or, where a line has been printed in the last segment, the aforementioned line spacing control means automatically indexes the typewriter the proper number of lines to position the logging sheet for receiving printing in the space 34 below the end of the last segment.

In the illustrated logging sheet, the segments are of the same size so that after the first line in the last segment 28 has been printed, the logging sheet is indexed at least twenty-four lines and in the illustrated example is indexed another five lines if no previous data has been previously recorded in the fifth line below the last segment 34. However, if other material has been previously recorded in this line, the log sheet must be indexed an additional amount to bring the logging sheet into a position just below the previously recorded data in this space. Line spacing control means is provided with suitable memory circuits for storing information as to the number of lines previously printed in the last segment 28 and also the number of lines which have been previously printed in the space 34, so that the logging sheet may be indexed to an unprinted line after printing in the last segment.

The space 34 below the last segment 28 is provided for automatic recording of abnormal process variable data occurring between regular hourly recording periods. This is important so that corrective action may be immediately taken when abnormal process variables occur, and a suitable audible annunciator system is associated with the typewriter which attracts the operator's attention to the logging sheet whenever an abnormal process variable is indicated. Additionally, means is provided for typing data on abnormal variables which have just returned to normal and the annunciator system is again energized during the typing of return to normal data to inform the attendant that the fault has been corrected. By typing the time of occurrence of the abnormal and return to normal data, the automatic process logging system of the invention enables the person analyzing the logging sheet quickly to determine the length of time during which a particular portion of the system being monitored was inoperative.

The space 34 may also be used for manual read-out of all process variables occurring between the regular hourly recording intervals. These data are recorded in the same vertical columns as the corresponding data was recorded in the segments of the logging sheet, but the data in the space 34 is not segmentalized so that information on the variables occupies two adjacent lines in the logging sheet space 34 where from fifty-one to one hundred variables are recorded. The logging system can be modified to print this manual read-out data as well as abnormal and return to normal data between the regular recording intervals in the segmental areas 26 and 28 of the logging sheet but, in such case, more than twenty-four lines per segment are required. This variation of the invention will be described hereinafter.

Figure 4:
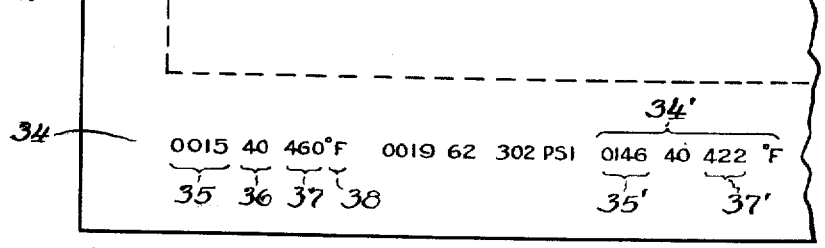
Fig. 4 is an enlarged fragmentary view of another portion of the logging sheet.

The abnormal data printed in the space 34 is preferably printed in red, although other distinguishing characteristics to all or a portion of the printing may be utilized. This abnormal data includes a time indication 35 (see Fig. 4), a point identification number 36, a number 37 indicating the value of the process variable, and the measurement units 38. When a particular variable has become abnormal between regular hourly recording intervals, the logging system prints the abnormal data once in the space 34. When such abnormal variable returns to normal, the logging system of the invention automatically prints the return to normal data once in the space 34, and this data is provided with a distinguishing indication (e.g. printed in black) to distinguish it from the abnormal data which, we will assume, was printed in red. The third group of data 34' shown in Fig. 4 represents data printed when the test point No. 40 has returned to normal. Thus, this data includes a new time 35' which indicates the approximate time at which the point 40 had returned to normal. The second number in this data, namely the number 40, refers to test point 40, and the third number 37' represents the new and normal value of the variable. By noting the time difference between the time data 35' and 35, the attendant is able to determine immediately the approximate length of time that the variable or test point 40 was abnormal. The return to normal data may be printed in black or other color different from that of abnormal variables as above described, or a distinguishing mark or letter may be added to the return to normal data to distinguish it from abnormal data. In the example shown in Fig. 4, it is assumed that the color of the printing for the return to normal data is different from that of the abnormal data.

When a complete line has been filled with printing in the space 34, the typewriter automatically indexes the logging sheet to receive printing on the subjacent line.

Abnormal data printed within the segments is also preferably typed in red or other color, while the normal readings are typed in black or a different color from the abnormal data. Whenever the typewriter prints an abnormal variable either within the segments or in the space 34, or when a return to normal data is printed, an audible alarm is sounded. An attendant by pressing a suitable button may terminate the audible alarm.

Just prior to every regular hourly recording interval the line spacing control means pulses the carriage shift magnet the proper number of times to bring the logging sheet to a position where the typewriter will type information immediately below the previously typed line in the upper segment 26. Since the number of lines occupied by the information typed below the bottom segment 28 varies, suitable means is provided for memorizing the location of the previous type line so that the logging sheet is automatically indexed to the proper position to begin a new hourly recording interval. The continuous belt construction of the logging sheet 12 permits the indexing of the logging sheet to this position by line spacing typewriter in the normal or forward direction.

Refer now to the simplified block diagram of Fig. 5 which outlines the various elements which control the operation of the electric typewriter 2. Box 60 represents a number of transducer elements, one for each process variable on which information is required. Each transducer produces a variable voltage, current, resistance, phase angle, etc., output which is a function of (preferably a linear function) the value of the associated process variable. In the case where temperatures are measured, the transducer elements may be thermocouples, or other temperature sensitive elements. Where other process variables relating to pressure or flow are involved, suitable well known transducers for converting measurements to voltages or other quantities which vary in a fixed relationship to the values of the process variables may be provided. The outputs of the various transducer elements are sequentially coupled by a scanner switching system 62 to a sensing device 64, which may be a null-balancing potentiometer where the transducers provide a variable magnitude voltage. The switching system 62 may comprise a number of stepping switches driven by a pulse timer 63. The pulse timer may comprise a synchronous motor and a number of cam operated switch contacts which interrupt electrical circuits to provide properly timed pulses for operating various parts of the system.

A null-balancing potentiometer provides a mechanical output in the form of a shaft movement, the angular position of which is a measure of the magnitude of the signal voltage fed to the sensing device. Thus, the angular position of the null-balancing potentiometer shaft 65 is a measure of the value of the process variable which is coupled to it at any particular instant by the switching system 62.

The output shaft motion of the sensing device 64 is fed to an analogue to digital converter 66 which converts the single shaft output of the sensing device to three separate shaft rotations representing respectively the three digits of a number representing the angular position of the shaft 65 which in turn represents the value of the process variable switched into the sensing device at that particular time. This is a well known type of digital converter of the electro-mechanical type. If desired, an electronic digital converter or other digital converter could be substituted for the electro-mechanical digital converter 66.

Electro-mechanical digital converters usually include three ten position switches represented by the reference numerals 66a, 66b and 66c, the wiper contacts of which connect with the contacts numbered 0–9 which represent the digits of a three digit number. The switches are positioned by three intermeshed gears or ratchet wheels having a ten to one step down ratio. If a transducer indicates, for example, that a process variable had a value of one hundred thirty-four, the wiper contact of the ten position units switch 66a is positioned to the number four contact, the wiper contact of the ten switch 66b would be on the number three contact and the wiper arm of the hundred switch 66c would be on the number one contact. Suitable transfer voltages are applied to the wiper contacts of these switches in a manner to be described.

The different switch contacts of the digital converter switches are respectively coupled to hundreds, tens and units section of a suitable code translator 68. Additional sections would be used, of course, with a four-digit number. The code translator 68 converts from a decimal indication to a five channel code indication. As is conventional in some types of code translators, each contact of the hundreds, tens and unit switches of the digital converter 66 is coupled through suitable groups of blocking diodes to one or more conductors of a five conductor code line, depending upon the particular five channel code used with the typewriter 2. Each switch of the digital converter is associated with a different five conductor code group representing the respective digits of a three digit number. In one five-channel code, for example, the digit zero is indicated by the energization of channels 2, 3 and 5. Accordingly, each of the zero contacts of the hundreds, tens and unit switches of the digital converter are connected through blocking diodes to channels 2, 3 and 5 leading respectively to the hundreds, tens and units register of a code storage unit 72.

The code storage unit is also a well known type of component which comprises banks of five self-holding relays in each of the storage registers 72a–c which, when energized, store information on the hundreds, tens and units digits, indicating the digital value of a process variable coupled to the sensing device at a particular moment. Each of the five relays in the hundreds, tens and units registers have respective contacts which lead to the five channel input 74 to the typewriter 2.

The information stored in code storage unit 72 is fed in the form of a voltage applied to one or more of the five input conductors in the typewriter input cable 8 when a transfer signal is fed sequentially to the hundreds, tens and units registers of the code storage unit 72 from a programmer 78. The programmer 78 is a device for controlling the kind and sequence of information fed to the typewriter. It may, for example, comprise various groups of stepping switches controlled by pulses from the pulse timer 63 at the appropriate time, and which, at the proper time, sequentially energize the hundreds, tens and units registers of the code storage unit 72 to transfer signal voltages through the closed storage relay contacts to the five channel input to the typewriter 2. The programmer 78 has two separate sections, namely, a cyclic read-out section 78a and an abnormal read-out section 78b. The cyclic read-out section 78a is automatically triggered into operation during the regular hourly scanning periods when all of the process variables are to be sequentially recorded in the logging sheet segments 26 and 28. The cyclic read-out section 78a may also be rendered active by closing of a manual read-out switch 79 during periods occurring between the normal hourly recording periods, for effecting the printing of data on all of the process variables scanned between the normal hourly recording periods. Although space could be provided in or between the logging sheet segments 26 and 28 for this purpose, it is preferred to record this information below the last log sheet segment 28.

The abnormal read-out section 78b of the programmer is automatically triggered into operation between the hourly scanning periods, and then only when new abnormal process variable data is obtained or new return to normal data is obtained. As above explained, information on the abnormal process variables may be grouped together below the last logging sheet segment 28 in the space 34.

Information on the time of any particular reading is stored in a digital time storage unit 80 which has respective registers 80a–d for tens and units hours measurement and tens and units minutes measurement. These respective registers may comprise suitable interconnected stepping switches connected as a decade counter which are actuated by timing pulses from the time controller 63. The various 0–9 digit indicating contacts of the stepping switches of the registers 80a through 80d of the digital time storage unit 80 may be coupled through one or more blocking diodes making up the code translator 82 to the five channel input to the typewriter 2. The information stored in the tens and units registers and the hours and minutes switches 80a to 80d is sequentially transferred to the typewriter input under the control of the programmer, which feeds an energizing transfer voltage sequentially to the wiper contacts of the digital time storage stepping switches which in turn energize the proper channel or channels of the typewriter input by means of the code translator blocking diodes.

In typing the first line of logging sheet segment 26, for example, the cyclic read-out section 78a is triggered into operation each hour, whereupon a transfer voltage is sequentially fed to the hours tens, hours units, minutes tens, and minutes units register of the digital time storage unit 80 to feed, in sequence, the proper signal voltages to the typewriter input which will cause the typewriter to type the time indication at the beginning of the first line of the segment 26. Following this, the cyclic read-out section 78a of the programmer sequentially scans the hundreds, tens and units register of the code storage unit 72 to effect feeding of the proper signals to the typewriter input which will type the digit indication of the process variable No. 1 at that time. The programmer section 78a then scans the storage unit 72 again to feed information to the typewriter which will print out the digit indication of the second process variable and this process repeats itself until the last process variable to be recorded in the first logging sheet segment 26 has been printed on the logging sheet. Then the cyclic read-out programmer sends a control signal to the switching system 62 to halt the scanning of the transducer 60 so that the logging sheet can be indexed twenty-nine lines to a position to receive information in the next segment by means of a line space control means 100, which sends the proper number of spacing pulses to the typewriter carriage shift relay. Following the indexing operation, the switching or scanning system 62 resumes operation, whereupon the cyclic read-out programmer section 78a again sends a transfer voltage successively to the time storage unit 80, and the code process variable measurement code storage unit 72 to print information on the next and succeeding process variable measurements.

As previously stated, whenever the sensing device 64 is coupled to a process variable which has an abnormal value, the typewriter 2 is to print the digital value of this abnormal process variable in a different color, namely red, than the normal or black color of the printing representing normal process variable values.

The circuit which carrier out this function is indicated in block form. It includes a number of individual set point potentiometers represented by box 90. There may be two individual set point potentiometers associated with each process variable so that abnormal process variable measurements which exceed any of two extreme values may be indicated in red on the typewriter logging sheet. The one or more set point potentiometers associated with the various process variables are sequentially fed through the switching circuit 62 to a comparator circuit 92 at the same time that the associated transducer 60 are fed by the switching system 62 to the sensing device 64. The voltage of the slide wire potentiometer of the null-balancing device 64 is compared in the comparator circuit 92 with the set point potentiometers of a particular process variable.

The comparator circuit 92 could, for example, comprise a suitable sensing amplifier with a relay in its plate circuit which is energized whenever the difference of the input voltages exceds a given predetermined value. The relay in the plate circuit of this amplifier is indicated by box 94 and constitutes what is to be called an alarm relay. When the alarm relay 94 is energized, an audible alarm 96 is sounded and a relay in the typewriter 2, which may be referred to as a ribbon shift relay, is energized by a contact of the alarm relay to shift the typewriter ribbon into a position where the machine will type in red. The alarm relay 94 remains energized until the information on the process variable being measured at that moment is transferred to the typewriter logging sheet. If the next test point scanned is a normal value, then, of course, the alarm relay will automatically become deenergized. The audible alarm 96 continues to sound until an acknowledge button 97 is depressed by the attendant.

The audible alarm 96 is under direct control of the alarm relay only during the regular scanning intervals. A suitable relay operated pair of switch contacts 99 is inserted in the line between the alarm relay contacts and the audible alarm which contacts 99 are closed only during the regular scanning intervals. Between the regular scanning intervals, the audible alarm is under the control of other components to be described hereinafter.

Following the printing of a complete line of information, on the last logging sheet segment 28, the line spacing control circuit 100 sends the proper number of line spacing pulses to the carriage shift relay of the typewriter so that the logging sheet is indexed preferably to a position to receive printing below the last logging sheet segment 28 where the machine remains on stand-by operation waiting for signals which indicate an abnormal condition or for manual read-out information. It can be appreciated that the number of positions which the logging sheet has to be indexed following the printing of a complete line on the second logging sheet segment 28 depends upon the line of that segment just printed as well as the position of the last complete printed line in the space below the last logging sheet segment 28. Accordingly, the line space control circuit 100 must be provided with an adding and subtracting memory circuit (with will be described later) so that the logging sheet can be indexed a number of lines equal to the number of lines between the first line of the last segment 28 and the first line to be printed below the last segment which is 30 minus the number of lines of the last segment printed plus the number of complete lines printed below the last segment 28.

The line spacing control circuit 100 additionally includes a means for sending twenty-nine pulses to index the logging sheet from one segment to another. The circuit also includes a memory circuit which counts the number of lines the logging sheet has been indexed since the printing of the last line in the first logging sheet segment 26. For example, assuming a chart containing two segments: for a twenty-four hour chart there would be twenty-four lines in each segment plus approximately five spaces or five lines between segments, plus five lines at the bottom of the second segment, plus approximately seventy lines or so going around the rear of the chart to the first line of the first segment. This makes a total of one hundred twenty-eight lines. The latter mentioned memory circuit would be capable of counting up to one hundred twenty-eight plus one and may comprise a three decade homing-type stepping switch arranged to store hundreds, tens and units and which is pulsed one count every time the carriage shift relay of the typewriter is pulsed once.

If the logging sheet is positioned to receive abnormal data in the space 34 below the logging sheet segments, say fifty-nine lines from the first line of the first logging sheet segment, then the latter memory circuit will be positioned to count position 59. Then, just prior to the regular hourly recording times, the memory circuit is continuously pulsed so as to home the decade count switches forming the memory circuit until count 129 is reached. Each time the homing switch is pulsed, the carriage shift relay in the typewriter is pulsed for line spacing purposes so that by the one hundred twenty-ninth count the logging sheet is position in the line of the first logging sheet segment below the previously typed line. A relay is automatically energized at the one hundred twenty-ninth count which stops the pulser which feeds the homing pulses and also homes all stepping switches not already homed so as to initiate another hourly recording cycle.

A more detailed block diagram description of the line space control circuit will be given later.

Thus far, all of the basic components by which the process variable are actually printed on the various segments of the logging sheet and also the method of line spacing have been explained. The additional components necessary to print out information on abnormal conditions below the last segment (or between the segments when this system is used) will now be described.

As previously stated, during the time periods between the regular hourly recording intervals the transducer elements 60 are continuously scanned by the switching system 62, and the output of the electrical sensing device 64 is continuously fed to the comparator 92 so that the system continuously hunts for abnormal process variable data. Whenever an abnormal process variable is scanned, the alarm relay 94 is energized, as above explained. However, this may or may not result in the printing of data or the sounding of the audible alarm depending upon whether or not the abnormal data refers to new abnormal data not previously printed. If the abnormal data was previously printed, then a new printing is prevented. If, on the other hand, the variable has just become abnormal so that the new abnormal data has not been previously printed, then the typewriter prints such data once on the logging sheet. Further, when an abnormal variable returns to normal, the apparatus of the invention prints this data once. Suitable distinguishing characteristics are applied to the abnormal and return to normal data so that they can be readily distinguished. Also, the audible alarm 96 is sounded whenever abnormal or return to normal data is printed.

The means for carrying out the latter functions is illustrated in Fig. 5 by blocks 105 and 107. The block 105 represents one or more banks of relays, referred to as memory relays, one relay being provided for each test point or variable monitored. Each relay memorizes the condition of the associated variable until the condition of the variable has changed and the recording of the new data has been initiated. The block 107 represents what is called a status check and control circuit which performs serveral functions. As the scanning switch scans a new variable, the circuit checks both the condition of the alarm relay 94 and the condition of the memory relay for the new variable to determine the condition of the variable during the previous scanning interval. If at a particular instant a variable is abnormal and the associated member relay indicates that it was normal during the previous scanning interval, then the status check circuit energizes the audible alarm 96 and causes the typewriter to print this new abnormal data. If, on the other hand, the alarm relay indicates an abnormal variable and the memory relay indicates that that variable was abnormal during the previous scanning interval, the status check circuit sees to it that neither the audible alarm nor the typewriter is operated.

Further, if the alarm relay indicates at any instant that the variable being scanned is normal, and the associated memory relay indicates that that variable was abnormal during the previous scanned interval, the status check control circuit then knows that the variable has just returned to normal and it accordingly energizes the audible alarm 96 and causes the typewriter to print the return to normal data.

As previously stated, where only abnormal data or return to normal data is desired, the audible alarm is not controlled directly by the alarm relay and the relay operated contacts 99 are maintained open. Where manual read-out data is desired between regular recording intervals, the depression of the manual read-out switch 79 effects the closing of the contacts 99 so that the audible alarm would be under the control of the alarm relay and the circuits defined by the blocks 105 and 107 would be inoperative to control the logging system.

The circuits for the memory relay banks 105 and the status check control circuit 107 will be discussed in more detail hereinafter.

When a particular scanned variable has first become abnormal or has just returned to normal, and the programmer 78 is accordingly triggered into operation, the abnormal read-out programmer section 78b scans the digital time storage unit 80 to transfer time information 35 (see Fig. 4) to the typewriter input after which time this programmer section feeds a transfer voltage sequentially to the abnormal point identification storage unit 102 which may be stepping switch storage unit similar to unit 80 except that they store information on the number of the test point being scanned at any instant and the unit for the variable associated with the test point.

Since the information on abnormal process variables typed below the last logging sheet segment is not presented in the columns corresponding with the point indicating columns in the logging sheet segments, it is necessary to indicate the particular process variable or test point as a digit number and also, for convenience, the units (degrees fahrenheit, pounds per square inch, etc.) of the process variable. The abnormal point identification storage unit 102 has hundreds, tens and units sections formed by decade stepping switches which are pulsed in synchronism with the switching system 62 so that the abnormal point identification storage unit 102 always indicates the identification of the process variable or test point which is scanned at any particular instant.

An abnormal measurement unit storage device 104 is provided which stores information of the units of the process variable being scanned at any particular time (by units is meant degrees fahrenheit, pounds per square inch, etc.). The various contacts of the stepping switches of the storage units 102 and 104 are connected to a code translator 106 which is similar to the code translators previously described. The programmer section 78b sequentially applies a transfer voltage to the abnormal point identification storage unit 102 which transfers the proper digital information of the number 36 (Fig. 4) of the process variable or test point to the typewriter input. Next the programmer 78 sequentially feeds a transfer voltage to the hundreds, tens and units register of the measurement code storage unit 72 which transfers digital information to the typewriter of the value of the abnormal process variable; then the programmer section 78b sequentially feeds a transfer voltage to the various registers of the abnormal measurement unit storage device 104 which transfers proper signals through the code translator 106 which will print out the units of measurement 37 and 38 (Fig. 4). Following the printing of the abnormal data, the alarm relay becomes unenergized and the abnormal read-out programmer section 78b is thereby rendered inoperative so that further information is not sent to the typewriter for printing until a subsequent new abnormal or return to normal condition is scanned by the switching system 62.

If manual read-out information is desired in the space 34 beneath the last logging sheet segment, the manual reset switch 79 is depressed which actuates the cyclic read-out program section 78a so that information on all of the process variables for a time between the normal recording times may be obtained on demand.

Refer now to Fig. 6 showing a detailed box diagram of the various elements making up the line spacing control circuit 100 in Fig. 5. To review the line spacing problem previously considered, the following line spacing operations must be automatically performed by the line spacing control means:

(1) The logging sheet must be indexed twenty-nine lines following the typing of a line in the first segment or, if more than two segments are used, after the typing of a line in all but the last segment.

(2) Following the typing of a line in the last segment, the logging sheet must be indexed so as to position the logging sheet for printing abnormal or manual read-out data in a line subjacent to the last printed line in the space 34 below the last logging sheet segment. As previously indicated, to accomplish this result the logging sheet must be indexed a number of lines equal to the quantity thirty minus the number of lines printed in the last segment plus the number of lines printed in the space 34 (this, of course, assumes that the first printed line in the space 34 occures five line spaces below the last segment).

(3) Just prior to the regular hourly recording intervals, the logging sheet must be indexed into a position such that the first hourly process data recorded is printed in the next line below the last printed line of the first segment.

In order to index the logging sheet twenty-nine lines following the typing of any complete line in the first segment, a cyclic process variable counter 120 is provided which counts the number of process variable data positions which have been printed in the logging sheet segments during each regular hourly recording interval. The counter may be any suitable mechanical or electronic counter driven by signals fed either from the switching system 62 or from the cyclic programmer section 78a. At the beginning of each hourly recording interval, the counter 120 must, of course, be reset to zero count position. When the counter 120 indicates the beginning of the fifty-first count, which ocurs when the fiftieth process variable has been recorded on a line of the first segment, a suitable pulse generator 122 is triggered into generating twenty-nine pulses which are fed to the carriage return or line shift magnet, which line spaces the typewriter twenty-nine times. The twenty-nine pulses at the output of the pulse generator 122 are also fed to the input of a total line memory unit 128 which may be a stepping switch counter having a maximum count position of one hundred twenty-nine, which is equal to the total number of lines around the logging sheet plus one. This counter is reset to zero just before the start of an hourly recording interval.

One of the functions of the total line memory counter is to keep track of the number of lines the logging sheet has been indexed from the last printed line in the first logging sheet segment. A carriage limit switch indicated by the reference numeral 130, which switch may be a microswitch which is tripped by the carriage of the type writer when the carriage reaches the end of its travel, is secured to the automatic typewriter so that a pulse is fed to the input of the total line memory counter every time the end of a printed line is reached. If line spacing occurs prior to the end of a line, then the proper number of pulses must be fed to the total line memory counter from other sources, such as the aforementioned twenty-nine pulses fed from the pulse generator 122. (Of course, where a segment contains a full line of printed matter, the first of the twenty-nine pulses is superfluous since the carriage limit switch also feeds a pulse in synchronism therewith.)

The total line memory counter also receives pulses from another pulse generator, to be described, which controls the number of lines the logging sheet is indexed following the printing of a line in the last segment.

In the case where only two segments are utilized, the completion of the printing of the last line of the second segment is indicated when the total line memory counter has accumulated a count of thirty therein. Accordingly, the number of lines printed in the second and last segment may be indicated by accumulating or counting the number of times in a day the total line memory counter had reached the thirtieth count. Accordingly, a last segment line counter 132 is coupled with the total line memory counter 128 so that a pulse is received each time the total line memory counter reaches the thirtieth count. This function is easily obtained by the use of stepping switches and control relays, although electronic counters could also be utilized.

If the logging sheet had three segments, then the last segment line counter 132 would indicate a number of printed lines in the last segment if the memory counter 128 would feed a pulse thereto each fifty-eighth count. Obviously, the last segment line counter 132 is reset to zero only once every twenty-four hours.

Since the pulse input to the last segment line counter 132 occurs on the completion of the printing of the last line in the last segment, this pulse may also be utilized to trigger a circuit which properly spaces the logging sheet to a line in the logging sheet space 34 which is just below the last printed line therein. Accordingly, the thirtieth line count pulse of the total line memory counter is also fed to a pulse generator 134 as a triggering pulse to initiate its operation. The pulse generator 134 then provides a number of pulses equal to thirty minus the accumulated count in the last segment line counter 132, plus the number of lines which have been printed or occupied in the abnormal and manual read-out space 34 of the logging sheet.

In order to count the number of lines printed in the space 34, a line accumulator unit 138 is provided which may consist of a stepping switch or other type counter which is similar to the total line memory counter 128 except that it accumulates counts from a reference position of fity-nine rather than zero, and its maximum count range is one hundred and twenty-eight. Also, it is reset to the fifty-ninth count position only once each day. Every time a new line is printed in the abnormal and read-out space 34 of the logging sheet, the accumulator unit 138 steps up one count.

A count comparator unit 136, which may comprise a series of stepping switches and relays arranged in a manner well known in the art, is provided which compares the count positions of the accumulator 138 and the total line memory counter 128. Whenever they coincide, a pulse is sent to a normally closed switch 139 which, when closed, couples the pulse to an abnormal and read-out line counter 140. The pulse steps the counter 140 one count to indicate the printing of a line in the logging sheet space 34. The latter counter 140 accumulates counts from zero count position at the beginning of each new twenty-four hour period and indicates the number of lines printed in the logging sheet space at any given time during such period.

As a count pulse is fed to the abnormal and read-out line counter 140, it in turn pulses the line accumulator 138 to advance it one count.

The pulses fed to the abnormal and read-out line counter 140 from the comparator unit 136 are halted during the time that the logging sheet is "homed" or returned to a position to receive printing in the first segment of the logging sheet at or just before the beginning of a regular hourly recording interval. The switch 139 between the output of the comparator unit 136 and the input to the abnormal and read-out line counter is opened during the "homing" interval when no printing is taking place in the logging sheet space 34.

It can be seen that with this arrangement the total count accumulated in the abnormal and read-out line counter 140 is a measure of the number of lines printed in the logging sheet space 34.

The output of the last segment line counter 132 and the line counter 140 is fed to an add and subtract counter 142. The add and subtract counter 142 may comprise a series of stepping switches which add and subtract from a thirty count switch position, thereby performing the aforementioned computation necessary to determine the number of lines which the logging sheet must be indexed after a printing in the last logging sheet segment. The counter 142 is, of course, reset to its thirty count reference position only once daily.

The pulse generator 134, which may also include a series of suitable stepping switches and control relay circuits, is connected with the add-subtract counter 142 so that when the pulse generator is triggered into operation by the thirtieth line count pulse originating from the total line memory counter 128, it will cause the pulse generator to generate a number of pulses equal to the count stored in the add-subtract counter 142. The output pulses of the pulse generator 134 are, of course, fed to the carriage return magnet which line spaces and also to the input of the total line memory counter so that this counter will indicate the total number of lines traversed since the printing of the last line in the first logging sheet segment.

The total line memory counter performs an additional important function of aiding in the automatic positioning or homing of the logging sheet to a position where the typewriter will print regularly hourly recorded data in the line of the first segment just below the last printed line. Thus, just prior to the beginning of a regular hourly recording cycle, a homing pulser 143 is triggered into operation and the pulses of the homing pulser 143 are fed to the input of the total line memory counter. The pulses are continuously fed to the latter counter until it has reached its maximum count of one hundred twenty-nine. Upon reaching the one hundred and twenty-ninth count, a stop pulse is fed from the total line memory counter 128 to the homing pulser 143 which causes the pulser to cease operation, and also returns the counter 128 to its zero count position. The output of the homing pulser 143 is also fed to the carriage return magnet so that the logging sheet is spaced a number of times equal to the difference between the number 129 and the count accumulated in the total line memory counter prior to its receiving homing pulses from the pulser 143. Thus, the logging sheet is automatically positioned so as to receive print in a line in the first segment subjacent to the last printed line therein.

Refer now to Fig. 7 showing a simplified circuit diagram of the memory relay banks 105, the status check and control circuit 107 and the alarm relay 94, which elements control in part the operation of the typewriter while scanning for abnormal variables or return to normal variables between regular hourly scanning intervals. As previously stated, the functions which are effected by these means are as follows:

(1) Where a particular scanned variable has just become abnormal, the typewriter is actuated to print, preferably in red, the abnormal variable data and the audible alarm 96 is sounded;

(2) If data on an abnormal variable was previously printed, then a rescanning of such abnormal variable should have no effect on either the audible alarm or the typewriter; and (3) If the abnormal variable has returned to normal, then the audible alarm 96 is sounded and the typewriter is actuated to print the return to normal data with a distinguishing characteristic, such as black print.

The memory relay banks 105 comprise a number of relay circuits made up of relay coils MR1—MR2—MR3, etc., one such circuit being provided for each test point or variable. One terminal of each relay is connected to a line 162 which may be energized with a negative direct current potential, and the other terminal of each relay is connected in series with a current limiting resistor R1—R2—R3, etc., and a set of holding contacts HC1—HC2—HC3, etc., of that relay which connects with the other power line 160 which may be connected to the positive terminal of a direct current voltage source. Once a particular relay has been energized, that relay remains energized by virtue of its holding contact unless the source of energizing potential is by-passed or removed from the relay coil. With each set of ten memory relay circuits, a stepping switch 164 is associated. The stepping switch may be a conventional telephone type stepping switch having eleven stationary contact points 166 and a wiper arm 168 adapted to make sequential contact with the stationary contacts. As in conventional telephone type stepping switches, they may be operated by means of a pulsed electromagnet (not shown) which actuates a pawl and ratchet wheel which steps the wiper one position as the electromagnet is pulsed once.

The juncture of each memory relay coil and its holding contact is connected to a different stationary contact of the associated stepping switch. The wiper arms of each of the stepping switches 164 are connected to a control bus 170 which effects the energization and deenergization of the relay coils. The stepping switches 164 have a resting or zero stationary contact which is unconnected with any relay coil so that the stepping switch may be in an idle position where it carries out no function. The switches are sequentially stepped so that each of the hundred or more memory relays MR1—MR91, etc. are separately connected to the control bus 170 in synchronism with the scanning of the associated test point.

In Fig. 7, the alarm relay 94 is also referred to by the reference letters AR to enable its contacts to be located more easily. The contacts associated with the relay coils identified by letter reference characters include the letters of the parent relay and a number indicating the particular set of contacts of that relay. The uncrossed parallel lines represent normally open contacts which means that the contacts are open when the associated relay is unenergized. Conversely, a parallel set of lines which are crossed by another line indicate a normally closed relay contact which means that the contacts are closed when the associated relay is deenergized.

The energization of the MR relays is controlled by a circuit including positive line 160, normally opened new alarm relay contacts NA1 and a normally opened set of contacts T1 connected to the control bus 170. The T1 contacts are controlled by a timing relay T which is deenergized during the time set aside for printing and is energized in the interim between the termination of the printing period and the time when the scanning switches 62 move on to the next test point. When a new test point is scanned which has just become abnormal, the contacts NA1 will close but this will not result in the energization of the MR coil connected to the control bus until the printing of the new abnormal data is complete when T1 closes.

An unenergized condition of an MR relay indicates that the associated test point was normal when previously scanned. The relay T would be energized by a suitable voltage pulse originating, for example, in the time controller pulser 63 following the printing of abnormal data, and the positive line 160 would then be connected to the MR relay coil associated with the variable then being scanned to energize the same through contacts NA1 and T1. The consequent closing of the holding contacts HC1 would maintain the last-mentioned MR relay coil energized until operated upon by a suitable potential on the control bus 170.

The previous condition of a variable being scanned at any particular instant is indicated by a sensitive type, high impedance alarm check relay AC having one terminal connected to the negative line 162 and the other terminal connected to the control bus 170. The alarm check relay AC is thus connected in parallel with the memory relay coil which is electrically connected to the stepping switch wiper 168 at any particular instant. The energization of the alarm check relay AC as a new test point as scanned therefore indicates that the test point or variable associated with the memory relay coil to which it is connected was abnormal during the previous scanning cycle. Conversely, the deenergization of the alarm check relay coil AC as a new test point as scanned indicates that the test point associated with the relay coil with which it is then connected was normal during the previous scanning cycle.

Circuit means is provided for actuating the audible alarm and the typewriter when the alarm relay AR has just become energized and the alarm check relay AC indicates that a variable was normal during the previous scanning cycle. This means includes a circuit extending from positive line 160 and including normally open alarm relay contacts AR1, normally closed alarm check relay contacts AC1 and a new alarm relay NA connected to the negative line 162. Thus, the new alarm relay NA will become energized when the alarm relay is energized indicating an abnormal variable and the alarm check relay AC is unenergized indicating that the memory relay connected at that instant is deenergized because the variable was normal during the previous scanning cycle. Suitable contacts of the new alarm relay NA (not shown) will then operate to energize the audible alarm, the typewriter and the red ribbon shift line to cause abnormal data to be printed in red in the space set aside for this information.

Following the typing of this data, the time relay T becomes energized, and the consequent closing of relay contacts T1 will cause the memory relay coil then connected to a wiper arm 168 to become energized. Then, the next time that that memory relay coil is connected to the wiper arm 168, the alarm check relay AC will be energized and the normally closed contacts AC1 of that relay will be open thereby deenergizing the new alarm relay NA and preventing the operation of the audible alarm 96 and the typewriter 2. Thus, abnormal data will be printed only once for each variable unless that variable has subsequently returned to normal.

Means are provided for operating the audible alarm and the typewriter when an abnormal variable returns to normal. This means includes a circuit extending from the line 160 and including normally closed alarm relay contacts AR2, normally opened alarm check relay contacts AC2, and a return to normal relay coil RN connected to the negative line 162. Assuming that a particular variable has just returned to normal, the next time the test point associated with that variable is scanned, the alarm check relay AC will be energized since the variable was abnormal during the previous scanning cycle, and the alarm relay AR will be deenergized. Consequently, normally closed alarm relay contacts AR2 will then be closed and the alarm check relay contacts AC2 will be closed, thereby energizing the return to normal relay RN. The contacts of the return to normal relay (not shown) are connected so as to energize the audible alarm 96 and to effect the operation of the typewriter 2. However, to provide a different color to the return to normal data, the red ribbon shift line will not be energized when the return to normal relay RN is operated. Following the typing of the return to normal data in the appropriate space on the logging sheet, another circuit will be established between the negative line 162 and the control bus 170 through a circuit including the normally open return to normal relay contacts RN1 and the normally opened contacts T2 of the timing relay T. Thus, before the scanning switches move on to the next test point, a negative voltage from the line 162 will be connected through the contacts RN1 and T2 to the wiper 168 which effectively shunts the then connected MR relay coil to deenergize the same and open its holding contacts. If the test point which has just returned to normal is scanned in a subsequent scanning cycle, the return to normal relay RN will not be energized because the alarm check relay coil AC will then be deenergized.

The status check and control circuit 107 is rendered inoperative during regular hourly scanning intervals or during manual read-out by suitable relay operated contacts 171 in the power line 160 which opens the power line circuit leading to the various relays of the circuit 107. Between regular hourly recording cycles where the system is scanning for abnormal or return to normal data, said switch contacts 171 are closed to effect the operation of the status check and control circuit 107.

In the embodiment of the invention just described, the abnormal and return to normal data obtained between regular hourly recording intervals as well as manual read-out data is printed in the space 34 beneath the last segment of the logging sheet. This, of course, has the advantage of segregating the regular recording interval data from other data occurring between regular hourly recording intervals. A substantial simplification of the circuitry may be effected by printing all data within the longitudinally spaced segments of the logging sheet. In this case, the number of lines in the segments 26 and 28 is increased so that it may accommodate twenty-four hours of regular variable data in addition to the maximum expected space necessary for manual read-out data and abnormal and return to normal data. For example, each of the segments 26 and 28 of the logging sheet may comprise thirty-four or more lines each rather than the twenty-four lines used in the previously described embodiment. Since it is desirable to expose both segments of the logging sheet simultaneously by having the two segments occupy slightly less than one-half of the logging sheet belt, an increase in the size of the logging sheet may be necessary over that previously described. The spacing between the drive and driven rolls 14 and 16 of the carriage must accordingly be increased.

Referring now to Fig. 2 as representing this modified logging sheet, the regular or hourly recorded data would be printed in the segments 26 and 28 as before described.

its last or number 409 position at which time the carriage limit switch will again be tripped. The number 409 contact position of the stepping switch is connected to the input of the return line space generator 188 so that the pulse produced by the carriage limit switch is connected to trigger the return line space generator so as to index the logging sheet to the next available line in the first segment.

Thus, the present invention has provided an automatic process logging system which automatically scans and records during regular recording intervals a large number of process variables and, additionally, which automatically prints data on abnormal variables once as each abnormal variable occurs, and also prints return to normal data once as each abnormal variable returns to normal. Further, distinguishing indications are provided for abnormal and return to normal data so that this data may be readily recognized. Further, audible alarm means are provided which attract the attendant's attention to the logging sheet when a variable becomes abnormal or a variable returns to normal. In a modified form of the invention, a substantial simplification of a circuitry necessary for the logging system has been effected by typing the aforementioned abnormal and return to normal as well as manual read-out data first in one line of a segment and then in a corresponding line of the next segment of the sheet if more than one line of printing between regular recording intervals is required.

It should be understood that numerous modifications may be made of the described embodiment of the invention without deviating from the broader aspects thereof. For example, the memory circuit 105 may be composed of latch relays, or thyratrons, magnetic storage devices, capacitors, or other bi-state storage elements. Still other variations in circuit details, in the general arrangement of the components or in operational sequence, may be made within the spirit of the invention.

In the claims to follow, the term "variables" should be broadly interpreted to include, for example, such variables as process variables (that is, variables of chemical or other processes, such as temperatures, pressures, flows, etc. of various parts of a process), or the physical or electrical variables of machinery, electrical circuits, etc., such as are found in electrical power plants and the like.

I claim:

1. In a data monitoring and logging system including scanning means for repeatedly scanning the conditions of a number of variables and typewriter recording means for recording information on the values of the variables, the improvement comprising: programming means having a signal passing condition where a recorder operating signal indicative of the value of the variable being scanned is fed to said recording means for recording, and having a signal gating condition where said recorder operating signals are unavailable to the recording means, abnormal condition responsive to the abnormal condition of a scanned variable, memory means in which is stored information on which of the variables are abnormal and which are normal during each scanning cycle, and condition comparison means responsive both to said abnormal condition responsive means and to said memory means and operating said programming means to its signal passing condition when said abnormal responsive means indicates that the variable being scanned is currently abnormal and the memory means indicates that the last mentioned variable was normal during the previous scanning cycle, said programming means including means for operating the same to its signal gating condition when said condition comparison means indicates that the current and past conditions of the scanned variable involved are both normal or both abnormal.

2. In a data monitoring and logging system including scanning means for repeatedly scanning the conditions of a number of variables and recording means for recording information on the conditions of the variables, the improvement comprising: programming means having a signal passing condition where a recorder operating signal indicative of the condition of the variable being scanned is fed to said recording means for recording, and having a signal gating condition where said recorder operating signals are unavailable to the recording means, means for operating said programming means to said signal passing condition during regular predetermined spaced scanning cycles where data on all of the scanned variables are recorded irrespective of the conditions of the variables, and condition selective means operative between said regular spaced scanning cycles and comprising abnormal condition responsive means responsive to the abnormal condition of a scanned variable, memory means in which is stored information on which of the variables are abnormal and which are normal during each scanning cycle, first condition comparison means responsive both to said abnormal condition responsive means and to said memory means and operating said programming means to its signal passing condition when said abnormal responsive means indicates that the variable being scanned is currently abnormal and the memory means indicates that the last mentioned variable was normal during the previous scanning cycle, second condition comparison means responsive both to said abnormal condition responsive means and to said memory means and operating said programming means to its signal passing condition when said abnormal responsive means indicates that the variable being scanned is currently normal and the memory means indicates that the last mentioned variable was abnormal during the previous scanning cycle, said programming means including means for operating the same to its signal gating condition when said condition comparison means indicates that the current and past conditions of the scanned variable involved are both normal or both abnormal, and print distinguishing means responsive to said condition comparison means for providing distinguishing indications to the abnormal and return to normal recorded data so that the two kinds of data can be readily distinguished.

3. In a data monitoring and logging system including scanning means for repeatedly scanning the conditions of a number of variables and recording means for recording information on the conditions of the variables, the improvement comprising: programming means having a signal passing condition where a recorder operating signal indicative of the condition of the variable being scanned is fed to said recording means for recording, and having a signal gating condition where said recorder operating signals are unavailable to the recording means, abnormal condition responsive means responsive to the abnormal condition of a scanned variable, memory means in which is stored information on which of the variables are abnormal and which are normal during each scanning cycle, and condition comparison means responsive both to said abnormal condition responsive means and to said memory means and operating said programming means to its signal passing condition when said abnormal responsive means indicates that the variable being scanned is currently abnormal and the memory means indicates that the last mentioned variable was normal during the previous scanning cycle, said programming means including means for operating the same to its signal gating condition when said condition comparison means indicates that the current and past conditions of the scanned variable involved are both normal or both abnormal.

4. In a data monitoring and logging system including scanning means for repeatedly scanning the conditions of a number of variables and recording means for recording information on the conditions of the variables, the improvement comprising: programming means having a signal passing condition where a recorder operating signal indicative of the condition of the variable being scanned is fed to said recording means for re- Following the printing of the regular recorded data in the last segment 28, suitable means provided for the purpose will cause the typewriter to index the logging sheet into a position where the typewriter will print in the line immediately below the last printed line of the first segment 26 rather than in the space 34 below the last segment. Then the abnormal data and return to normal data is printed in a manner similar to that described previously. When a complete line has been filled with this data, the typewriter automatically indexes the logging sheet so that it will print abnormal and return to normal data in the line of the next segment 28 immediately below the last printed line. When the abnormal and return to normal data completely fills the line in the last segment 28, the logging sheet is automatically indexed so that it will print in the line immediately below the last printed line in the first segment. This process then repeats itself as lines of abnormal and return to normal data are completed.

Since these spacings between segments and between the last segment and the first segment are always respectively the same, there is no need for providing counting means for keeping track of the number of lines of abnormal or return to normal data as in the previous embodiment. This greatly simplifies the logging equipment.

Line spacing for manual read-out data is similar to that just described. Where manual read-out is provided between regular scanning intervals, the manual read-out switch 79 is pressed as before. After one line of such data has been printed in the first segment, the typewriter automatically indexes the logging sheet so as to print the remaining data in the next available line of the next segment of the logging sheet. Following the completion of this line, and assuming that only two segments are involved, the typewriter automatically indexes the logging sheet so as to permit the next printing in the next lowest line of the first segment.

The manual read-out data is printed in vertical columns in line with other data of the same test point. However, the abnormal and return to normal data occurring between regular recording intervals need not and purposely is not altogether in alignment with the regular and manual read-out data. By spacing the number groups of the abnormal and return to normal data closer together, as shown in the third line of Fig. 9, the latter data stands out from the former. Another way to accomplish a similar result is to begin the printing of abnormal and return to normal several spaces inward from the left margin of the logging sheet so that this data is centered somewhat between the vertical columns of the regular recorded data.

This modified form of the invention is substantially identical to the invention shown in block form in Fig. 5 except that the line space control circuit 100 is modified as shown in simplified schematic and block form in Fig. 8, to which reference should now be had.

The line space control circuit 100' shown in Fig. 8 includes a counter 180 which automatically provides information as to which segment of the logging sheet is opposite the type-receiving section of the typewriter, and also provides information as to which portion of a line in the segment is positioned opposite the type-receiving section of the typewriter. Although many different types of counters may be utilized, Fig. 8 shows, diagrammatically, a stepping switch type counter which has a number of count positions equal to the number of available spaces in two lines of printed matter plus one. In actual practice, a series of stepping switches may be used to accumulate the total count, and only one stepping switch with a large number of positions is shown merely for the sake of simplicity. If, for example, each line of the logging sheet has 204 possible positions, the counter will be adapted to accumulate a count of 409 and will then automatically be returned to a zero or reference position as it reaches a 409th count position.

Figure 9:
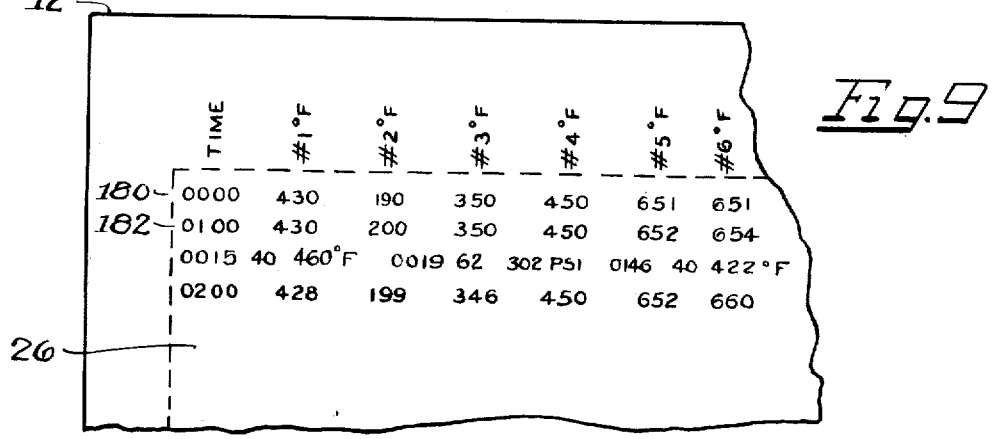
Fig. 9 is a view of the logging sheet resulting from the modified form of the invention shown in Fig. 8.

As the typewriter steps one or more positions from an initial position which would be the position of the first zero in line 180 of Fig. 9, the stepping switch counter 180 will step a corresponding number of positions. This stepping switch may be a conventional telephone type stepping switch controlled from a suitable electro-magnet which derives pulses from a portion of the programmer 78 which controls the position of the printing on each line of the logging sheet.

The wiper 184 of the stepping switch 180 is coupled to a suitable source of pulses, which may be the time controller pulser 63, which provides a pulse just prior to the initiation of a regular hourly or cyclic recording interval. The number 2 to the number 204 contacts of the stepping switch 180 are connected directly with the carriage return magnet via a common line 186 so that the carriage return magnet will be pulsed to index the logging sheet one line and return the same to the beginning of the new line if the type-receiving portion of the typewriter is opposite any position of the logging sheet of the first segment other than the first position, so that the regular recorded data may be typed in the appropriate columns provided therefor. If the pulse fed to the wiper 184 occured while the wiper contacted the number one position, then no line spacing occurs because the number one contact is unconnected to any circuit.

The number 205 through 408 stationary contacts of the counter 180 are connected to the input of a return line space generator 188 which is triggered into operation upon the reception of a pulse fed to the wiper 184 just prior to the regular recording interval. The output of the generator is, of course, coupled to the carriage return magnet. The return line space generator may be any suitable generator which will generate a fixed number of pulses when triggered equal to the number of lines which the logging sheet must be indexed to bring the type-receiving section of the typewriter from a line in the second or last segment of the logging sheet back to the line below the last printed line of the first logging sheet segment 26. This number will always be the same. The same pulse which is fed to the wiper 184 may be utilized to actuate the control mechanism for the stepping switch to return it to its number one or start position. Such techniques are well known in various arts where stepping switches are used.

A second stepping switch counter 182 is provided which operates in the identical manner as the counter 180 to control spacing between the segments 26 and 28 of the logging sheet and also from the segment 28 back to the segment 26 when the line of the second segment 28 has been completed. To this end, the carriage limit switch 130, previously mentioned, which produces a pulse when the end of a line on the logging sheet has been reached, is connected to the wiper 190 of the stepping switch 182. Only the number 205 and number 409 positions of this switch are utilized, assuming a line of 204 spaces. Thus, when the printing on the number 204 space of a line in the first segment is completed, and the typewriter will be spaced at least one position as is conventional in manual and electric typewriters, the counter 182 will advance to the next number 205 position. As this occurs, the carriage limit switch is tripped and the pulse produced thereby is coupled through the wiper 190 and the number 205 contact position thereof to the input of an intersegment line space pulse generator 122' which is then triggered into operation to produce a fixed number of pulses necessary to index the logging sheet from the first segment to the line below the last printed line of the second logging sheet segment. This spacing is, of course, a fixed amount no matter how many lines have been typed in either the first or the second logging sheet segment. The output of generator 122' is connected to the carriage return magnet as are the other line space generators previously discussed.

When the typewriter has printed in the last available space of the second segment, the typewriter carriage is traversed one position which would step the counter to cording, and having a signal gating condition where said recorder operating signals are unavailable to the recording means, abnormal condition responsive means responsive to the abnormal condition of a scanned variable, memory means in which is stored information on which of the variables are abnormal and which are normal during each scanning cycle, and first condition comparison means responsive both to said abnormal condition responsive means and to said memory means and operating said programming means to its signal passing condition when said abnormal responsive means indicates that the variable being scanned is currently abnormal and the memory means indicates that last mentioned variable was normal during the previous scanning cycle, and second condition comparison means responsive both to said abnormal condition responsive means and to said memory means and operating said programming means to its signal passing condition when said abnormal responsive means indicates that the variable being scanned is currently normal and the memory means indicates that the last mentioned variable was abnormal during the previous scanning cycle, said programming means including means for operating the same to its signal gating condition when said condition comparison means indicates that the current and past conditions of the scanned variable involved are both normal or both abnormal.

5. In a data monitoring and logging system including scanning means for repeatedly scanning the conditions of a number of variables and recording means for recording information on the conditions of the variables, the improvement comprising: programming means having a signal passing condition where a recorder operating signal indicative of the condition of the variable being scanned is fed to said recording means for recording, and having a signal gating condition where said recorder operating signals are unavailable to the recording means, abnormal condition responsive means responsive to the abnormal condition of a scanned variable, memory means in which is stored information on which of the variables are abnormal and which are normal during each scanning cycle, and condition comparison means responsive both to said abnormal condition responsive means and to said memory means and operating said programming means to its signal passing condition when said abnormal responsive means indicates that the variable being scanned is currently normal and the memory means indicates that the last mentioned variable was abnormal during the previous scanning cycle.

6. In a data monitoring and logging system including scanning means for repeatedly scanning a number of variables and typewriter recording means for recording the values of the variables scanned, the improvement comprising: typewriter control means having a first condition where the typewriter prints data information in a first manner and a second condition where the typewriter prints in a second manner, abnormal condition responsive means responsive to the abnormal condition of a scanned variable, memory means in which is stored information on which of the variables are abnormal and which are normal during each scanning cycle, first condition comparison means responsive to both said abnormal condition responsive means and to said memory means and effecting the operation of said typewriter control means to said first condition where the value of the variable involved is printed in said first manner when said abnormal condition responsive means indicates that the variable involved is currently abnormal and the memory means indicates that the variable was normal during the previous scanning cycle, and second condition comparison means responsive to both said abnormal condition responsive means and to said memory means and effecting the operation of said typewriter control means to said second condition of operation where the value of the variable involved is printed in said second manner when said abnormal responsive means indicates that the variable is currently normal and the memory means indicates that the variable was abnormal during the previous scanning cycle, whereby abnormal and return to normal values can be readily distinguished.

7. An automatic logging system comprising means for sequentially and repeatedly scanning a number of test points to be monitored, a recording device for recording abnormal and return to normal data on said test points when information is fed thereto from said scanning means, memory means associated with each test point for storing information on the abnormal and normal condition of the associated test point, means for operating said memory means to store information on said conditions of the associated test point during a given scanning cycle until such condition changes and the recording of new data on the changed condition has been initiated, means following the initiation of the recording of new data on the changed condition for substituting in said memory means information on the new condition of the test point for the information on the previous condition thereof, control means normally preventing the signals derived from said scanning means from reaching said recording device, and means for connecting said control means to the memory means associated with the test point being scanned at any instant, said control means being responsive to the condition of the test point scanned at any instant and to the memory means to which it is connected by coupling data signals derived from said scanning means to said recording device when a scanned test point is abnormal and the memory means to which it is connected indicates that the test point was previously normal, and said control means also coupling data signals derived from said scanning means to the recording device when the test point being scanned is normal and the connected memory means shows that the associated test point was previously abnormal.

8. An automatic logging system comprising means for sequentially and repeatedly scanning a number of test points to be monitored, a recording device for recording abnormal data on said test points when information is fed thereto from said scanning means, memory means associated with each test point for storing information on the abnormal condition of the associated test point, means for operating said memory means to store information on said condition of the associated test point during a given scanning cycle until the condition changes and the recording of new data on the changed condition has been initiated, means following the initiation of the recording of new data on the changed condition for substituting in said memory means information on the new condition of the test point for the information of the previous condition thereof, control means normally preventing the signals derived from said scanning means from reaching said recording device, and means for connecting said control means to the memory means associated with the test point being scanned at any instant, said control means being responsive to the condition of the test point scanned at any instant and to the memory means to which it is connected by coupling data signals derived from said scanning means to said recording device when a scanned test point is abnormal and the memory means to which it is connected indicates that the test point was previously normal.

9. An automatic logging system comprising means for sequentially and repeatedly scanning a number of test points to be monitored, a recording device for recording return to normal data on said test points when information is fed thereto from said scanning means, memory means associated with each test point for storing information on the normal and abnormal condition of the associated test point, means for operating said memory means to store information on said condition of the associated test point during a given scanning cycle until the condition changes and the recording of new data has been initiated, means following the initiation of the recording of new data on the changed condition for substituting in said memory means information on the new condition of the test point for the information on the previous condition thereof, control means normally preventing the signals derived from said scanning means from reaching said recording device, and means for connecting said control means to the memory means associated with the test point being scanned at any instant, said control means being responsive to the instantaneous condition of the test point scanned at any instant and to the memory means to which it is connected by coupling data signals derived from said scanning means to said recording device when the test point being scanned is normal and the connected memory means shows that the associated test point was previously abnormal.

10. In a logging system having scanning means for repeatedly scanning a large number of variables, an automatic typewriter to record data on the variables, and control means for sequentially feeding the scanned data into the typewriter for printing during regular spaced intervals, the improvement comprising support means on the carriage of the typewriter for supporting a continuous belt logging sheet on which the variable data are to be printed, means for indeving the logging sheet in a given direction lengthwise thereof in a fixed predetermined manner from one segmental area thereof to another segmental area during a scanning interval so that data on a number of variables greater than the number that can be accommodated by the width of the logging sheet may be recorded along the width of the logging sheet in longitudinally spaced segmental areas of the sheet, means for automatically indexing the logging sheet from the latter segmental area to the former segmental area immediately following the completion of the regular sequential recording of data on the variables during said regular spaced intervals, means responsive to the existence of abnormal variables between regular recording intervals for feeding data on such variables to said typewriter where the abnormal data is printed in said segmental areas, and means responsive to the return to normal of said previously abnormal variables for feeding data on same to said typewriter for printing in said logging sheet segments between said regular recording intervals.

11. In a logging system having scanning means for continuously scanning a large number of variables, an automatic typewriter to record data on the variables, and control means for sequentially feeding the scanned data into the typewriter for printing during regular spaced intervals, and for feeding data on some of the variables to said typewriter for printing between said regular spaced intervals, the improvement comprising means for indexing the logging sheet lengthwise thereof a fixed predetermined number of lines from one segmental area to another segmental area thereof following the completion of a printed line in a segment so that data on a number of variables greater than the number that can be accommodated by the width of the logging sheet may be recorded along the width of the logging sheet in longitudinally spaced segmental areas of the sheet, means responsive to the completion of the printing of a line in the last segment of the log sheet, both during and between said regular spaced intervals, means responsive to said last mentioned means both during and between said regular spaced intervals for automatically indexing the logging sheet from the last segmental area to the first segmental area where the logging sheet may receive printing in a line below the last printed line of the first segment immediately following the completion of any printed line in the last segment of the logging sheet so that data scanned during and between said regular spaced intervals are treated alike in that they are recorded in the same segmental areas of the log sheet in the order scanned, means for keeping track of the logging sheet segment which is in position to receive printing at any instant, and means responsive to said last-mentioned means for indexing the logging sheet just prior to the beginning of the regular recording interval to the next available full line below the last printed line in the first logging sheet segment.

12. A logging system having scanning means for continuously scanning a large number of variables, an automatic typewriter to record data on the variables automatically, control means for automatically and sequentially feeding all of the scanned data into the typewriter for printing during regular spaced intervals, manually operable means for operating said control means to feed sequentially the scanned data to said typewriter for printing at practically any time, said control means including means for automatically and selectively feeding scanned data on abnormal variables and on variables which have returned to normal to said typewriter for printing between said regular recording intervals, and means for controlling the line spacing of said logging sheet, said line space control means including means for indexing said logging sheet a fixed number of lines sufficient to accommodate all expected information on a given number of variables less than the total scanned over a given period of time including many of said spaced intervals, and following the completion of a printed line, whereby data is grouped in longitudinally spaced segments on the logging sheet, means responsive to the completion of the printing of a line in the last segment of the log sheet, both during and between said regular spaced intervals, means responsive to said last mentioned means both during and between said regular spaced intervals for indexing said logging sheet a fixed number of lines immediately following the completion of the printing of any line in the last segment of the logging sheet so that data scanned during and between said regular spaced intervals are treated alike in that they are recorded in the same segmental areas of the log sheet in the order scanned, said last-mentioned fixed number of lines being sufficient to bring the logging sheet to a position to receive printing in the line below the last printed line of the first segment of the logging sheet, and means for indexing said logging sheet just prior to the beginning of a regular recording interval to the next available full line below the last printed line in the first logging sheet segment.

13. A logging system having scanning means for continuously scanning a large number of variables, an automatic typewriter to record data on the variables automatically, control means for automatically and sequentially feeding all of the scanned data into the typewriter for printing during regular spaced intervals, said control means including means for automatically and selectively feeding scanned data on abnormal variables to said typewriter for printing between said regular recording intervals, and means for controlling the line spacing of said logging sheet, said line space control means including means for indexing said logging sheet a fixed number of lines sufficient to accommodate all expected information on a given number of variables less than the total scanned over a given period of time including many of said spaced intervals, following the completion of a printed line, whereby data is grouped in longitudinally spaced segments on the logging sheet, means responsive to the completion of the printing of a line in the last segment of the log sheet, both during and between said regular spaced intervals, means responsive to said last mentioned means both during and between said regular spaced intervals for indexing said logging sheet a fixed number of lines immediately following the completion of any line in the last segment of the logging sheet so that data scanned during and between said regular spaced intervals are treated alike in that they are recorded in the same segmental areas of the log sheet in the order scanned, said last-mentioned fixed number of lines being sufficient to bring the logging sheet to a position to receive printing in the line below the last printed line of the first segment of the logging sheet, and means for indexing said logging sheet just prior to the beginning of a regular recording interval to the next available full line below the last printed line in the first logging sheet segment.

14. A logging system having scanning means for continuously scanning a large number of variables, an automatic typewriter to record data on the variables automatically, control means for automatically and sequentially feeding of the scanned data into the typewriter for printing during regular spaced intervals, manually operable means for operating said control means to feed sequentially the scanned data to said typewriter for printing at practically any time, and means for controlling the line spacing of said logging sheet, said line space control means including means for indexing said logging sheet a fixed number of lines sufficient to accommodate all expected information on a given number of variables less than the total scanned over a given period of time including many of said spaced intervals, following the completion of a printed line, whereby data is grouped in longitudinally spaced segments on the logging sheet means responsive to the completion of the printing of a line in the last segment of the log sheet, both during and between said regular spaced intervals, means responsive to said last mentioned means both during and between said regular spaced intervals for indexing said logging sheet a fixed number of lines immediately following the completion of the printing of any line in the last segment of the logging sheet so that data scanned during and between said regular spaced intervals are treated alike in that they are recorded in the same segmental areas of the log sheet in the order scanned, said last-mentioned fixed number of lines being sufficient to bring the logging sheet to a position to receive printing in the line below the last printed line of the first segment of the logging sheet.

15. A logging system having scanning means for continuously scanning a large number of variables, an automatic typewriter to record data on the variables automatically, control means for automatically and sequentially feeding all of the scanned data into the typewriter for printing during regular spaced intervals, said control means including means for automatically and selectively feeding scanned data on some of the variables to said typewriter for printing between said regular recording intervals, and means for controlling the line spacing of said logging sheet, said line space control means including means for indexing said logging sheet a fixed number of lines sufficient to accommodate all expected information on a given number of variables less than the total scanned over a given period of time including many of said spaced intervals, following the completion of a printed line, whereby data is grouped in longitudinally spaced segments on the logging sheet, means responsive to the completion of the printing of a line in the last segment of the log sheet, both during and between said regular spaced intervals, means responsive to said last mentioned means both during and between said regular spaced intervals for indexing said logging sheet a fixed number of lines immediately following the completion of the printing of any line in the last segment of the logging sheet so that data scanned during and between said regular spaced intervals are treated alike in that they are recorded in the same segmental areas of the log sheet in the order scanned, said last-mentioned fixed number of lines being sufficient to bring the logging sheet to a position to receive printing in the line below the last printed line of the first segment of the logging sheet, and means for indexing said logging sheet just prior to the beginning of a regular recording interval to the next available full line below the last printed line in the first logging sheet segment.

16. In a data monitoring and logging system including scanning means for repeatedly scanning the conditions of a number of variables and typewriter recording means for recording information of the values of the variables, the improvement comprising: programming means having a signal passing condition where a recorder operating signal indicative of the value of the variable being scanned is fed to said recording means for recording, and having a signal gating condition where said recorder operating signals are unavailable to the recording means, means for operating said programming means to said signal passing condition during regular predetermined spaced scanning cycles where data on all of the scanned variables are recorded irrespective of the conditions of the variables, and condition selective means operative between said regular spaced scanning cycles and comprising abnormal condition responsive means responsive to the abnormal condition of a scanned variable, memory means in which is stored information on which of the variables are abnormal and which are normal during each scanning cycle, first condition comparison means responsive both to said abnormal condition responsive means and to said memory means and operating said programming means to its signal passing condition when said abnormal responsive means indicates that the variable being scanned is currently abnormal and the memory means indicates that the last mentioned variable was normal during the previous scanning cycle, and second condition comparison means responsive both to said abnormal condition responsive means and to said memory means and operating said programming means to its signal passing condition when said abnormal responsive means indicates that the variable being scanned is currently normal and the memory means indicates that the last mentioned variable was abnormal during the previous scanning cycle, said programming means including means for operating the same to its signal gating condition when said condition comparison means indicates that the current and past conditions of the scanned variable involved are both normal or both abnormal.

17. In a data monitoring and logging system including scanning means for repeatedly scanning the conditions of a number of variables and typewriter recording means for recording information on the values of the variables, the improvement comprising: programming means having a signal passing condition where a recorder operating signal indicative of the value of the variable being scanned is fed to said recording means for recording, and having a signal gating condition where said recorder operating signals are unavailable to the recording means, abnormal condition responsive means responsive to the abnormal condition of a scanned variable, memory means in which is stored information on which of the variables are abnormal and which are normal during each scanning cycle, first condition comparison means responsive both to said abnormal condition responsive means and to said memory means and operating said programming means to its signal passing condition when said abnormal responsive means indicates that the variable being scanned is currently abnormal and the memory means indicates that the last mentioned variable was normal during the previous scanning cycle, and second condition comparison means responsive both to said abnormal condition responsive means and to said memory means and operating said programming means to its signal passing condition when said abnormal responsive means indicates that the variable being scanned is currently normal and the memory means indicates that the last mentioned variable was abnormal during the previous scanning cycle, said programming means including means for operating the same to its signal gating condition when said condition comparison means indicates that the current and past conditions of the scanned variable involved are both normal or both abnormal.

(References on following page)

References Cited in the file of this patent
UNITED STATES PATENTS

| | | |
|---|---|---|
| 1,247,151 | Roberts | Nov. 20, 1917 |
| 2,183,147 | Moore et al. | Dec. 12, 1939 |
| 2,313,752 | LeClair | Mar. 16, 1943 |
| 2,372,593 | McWhirter et al. | Mar. 27, 1945 |
| 2,564,294 | Belcher | Aug. 14, 1951 |
| 2,713,157 | Collins | July 12, 1955 |
| 2,726,130 | Meadows et al. | Dec. 6, 1955 |
| 2,818,321 | Searles | Dec. 31, 1957 |